3,845,035
NOVEL N(6)-SUBSTITUTED ADENOSINE COMPOUNDS AND THERAPEUTIC COMPOSITIONS
Wolfgang Kampe, Heddesheim, Erich Fauland, Mannheim-Waldhof, Max Thiel and Wolfgang Juhran, Mannheim, and Harald Stork, Mannheim-Feudenheim, Germany, assignors to Boehringer Mannheim GmbH, Mannheim, Germany
No Drawing. Filed July 12, 1972, Ser. No. 271,098
Claims priority, application Germany, July 22, 1971,
P 21 36 624.5
Int. Cl. C07d 51/54
U.S. Cl. 260—211.5 R                17 Claims

ABSTRACT OF THE DISCLOSURE

Novel N(6)-substituted adenosine compounds of the formula:

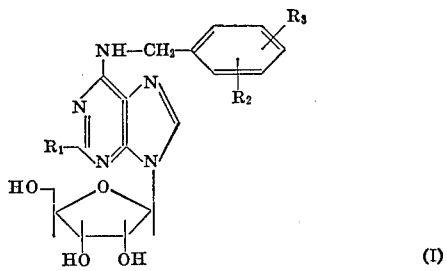

wherein $R_1$ is hydrogen, halogen, amino, or hydroxyl;
$R_2$ is nitro, cyano or hydroxy-methyl; and
$R_3$ is hydrogen, halogen, lower alkyl or lower alkoxy radical;

and pharmacologically compatible salts thereof are markedly effective in improving circulatory action and also in decreasing serum lipids in mammals.

---

The present invention is concerned with novel N(6)-substituted adenosine compounds, with therapeutic compositions containing them and with the therapeutic methods using such compounds.

The new N(6)-substituted adenosine compounds of the present invention are of the formula:

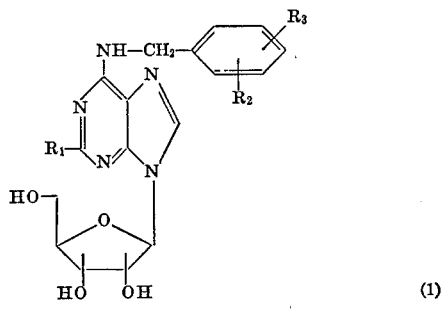

wherein $R_1$ is hydrogen, halogen, amino, or hydroxyl;
$R_2$ is nitro, cyano or hydroxy-methyl; and
$R_3$ is hydrogen, halogen, lower alkyl or lower alkoxy radical;

as well as the pharamacologically compatible salts thereof.

By the terms "lower" alkyl or alkoxy, we mean radicals containing, e.g., 1 to 10, preferably 1 to 6, carbon atoms.

We have found that the new compounds (I) have a very good circulatory action and also bring about a decrease of the serum lipids.

The new compounds (I) according to the present invention can be prepared, for example, either by reacting a purine riboside of the general formula:

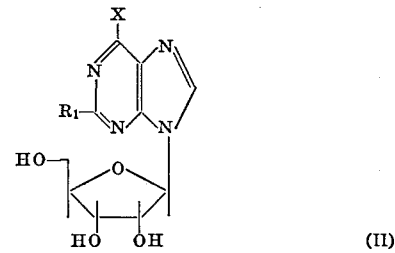

in which $R_1$ has the same meaning as above and X is a halogen atom or a reactive mercapto grouping, with a benzylamine of the general formula:

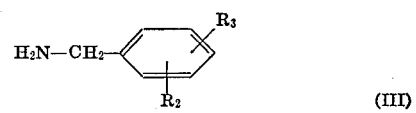

in which $R_2$ and $R_3$ have the same meanings as above, possibly with the intermediate protection of the hydroxyl groups of the sugar residue, or, when $R_1$ is to be a hydrogen atom, by heating in alkaline solution an $N^1$-substituted adenosine derivative of the general formula:

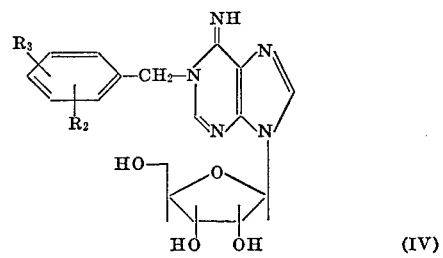

in which $R_2$ and $R_3$ have the same meanings as above, or a derivative thereof in which the hydroxyl groups of the sugar residue are protected, whereafter, if necessary, any protective groups present are removed by acid hydrolysis.

The compounds (I) thus obtained can then, if desired, be reacted with acids to give the corresponding salts.

As starting materials (II), there are used, in particular, purine ribosides in which $R_1$ and X are chlorine or bromine atoms, such as are described, for example, in J. Heterocyclic Chem., 1, 213/1964 and in J. Org. Chem, 31, 3262/1966. Furthermore, there can also be used compounds (II) in which $R_1$ is a hydrogen atom or an amino group and X is a chlorine or bromine atom; such compounds are described, for example, in Coll. Czech. Chem. Comm., 30, 1880/1965 and in J. Org. Chem., 28, 945/1963. However, there can also be used compounds (II) in which $R_1$ is a hydroxyl group and X is a methylthio or benzylthio radical. These compounds can be obtained, for example, by diazotization of the thioguanosine derivatives described in Chem. Pharm. Bull. (Japan), 12, 951/1964.

For the reaction of the purine riboside derivatives (II) with the compounds (III), the reaction components are expediently heated in an appropriate inert solvent, preferably in a higher boiling alcohol or ether, for example, n-propanol, isopropanol, butanol, tetrahydrofuran or dioxan, optionally in the presence of an equimolar amount of a tertiary amine, preferably of triethylamine, or left to stand for several days at ambient temperature. However, the solvent can also be omitted and, in place thereof, one of the reaction components, preferably the amino component (III), is used in excess.

If it is desired temporarily to protect the hydroxyl groups in the compounds (II), there can be used the protective groups conventionally employed in sugar chemistry. For this purpose, there can, for example, be used acyl (e.g., alkanoyl) radicals, preferably acetyl or benzoyl radicals, or ketals can be used, for example, the 2',3'-isopropylidene compounds, which after the condensation reaction has taken place, can easily be converted into the free 2',3'-dihydroxy compounds by the action of acids, for example of formic acid or dilute mineral acids; when acyl radical are used as protective groups, these can be split off by alkaline hydrolysis.

The compounds (IV) used as starting materials can be prepared by the reaction of adenosine or of adenosine acetals or ketals with conventional N-alkylation agents. Preferably, there are used compounds of the general formula:

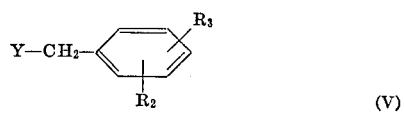

(V)

in which $R_2$ and $R_3$ have the same meanings as above and Y is a reactive residue, for example a halogen atom, an aliphatic or aromatic sulfonyl radical or the like.

In a preferred variant of this process, the isolation of the compounds (IV) is omitted, the solution being rendered weakly alkaline and heated for a short period of time. In this way, there are obtained directly the compounds (I) or the corresponding acetals or ketals, which are subsequently split by acids to give the free adenosine derivatives.

The pharmacologically compatible salts are obtained in the usual manner by neutralization of the free bases (I) with non-toxic inorganic or organic acids, for example, hydrochloric acid, sulfuric acid, phosphoric acid, hydrobromic acid, acetic acid, lactic acid, citric acid, oxalic acid, malic acid, salicyclic acid, malonic acid or succinic acid.

The following Examples are given for the purpose of illustrating the compounds of the present invention and their preparation:

Example 1.—Preparation of N(6)-(2-Hydroxymethyl-benzyl)-adenosine 2.86 g. 6-chloro-9-($\beta$-D-ribofuranosyl)-purine, 2.0 g. 2-hydroxymethyl-benzylamine hydrochloride and 5.5 ml. triethylamine were heated under reflux for 1.5 hours in 50 ml. methanol. After cooling the reaction mixture, the precipitate formed was filtered off with suction and recrystallized from 350 ml. methanol/water (1:1). There were obtained 3.0 g. (77% of theory) N(6)-(2-hydroxymethylbenzyl)-adenosine, which has a melting point of 226–227° C.

Example 2.—Preparation of N(6)-(3-Hydroxymethyl-2-methyl-benzyl)-adenosine 6.2 g. triacetyl-6-chloro-9-($\beta$-D-ribofuranosyl)-purine, 3.2 g. 3-hydroxymethyl-2-methyl-benzylamine hydrochloride and 4.0 ml. triethylamine were heated under reflux for 4 hours in 75 ml. isopropanol. The reaction mixture was then evaporated in a vacuum and the residue taken up in chloroform. The chloroform phase was washed several times with water, dried and evaporated. The residue was dissolved in 50 ml. methanol and the solution, after the addition of 3 ml. 1N sodium methylate solution, heated under reflux for 10 minutes. The precipitate obtained upon cooling was filtered off with suction and recrystallized from 200 ml. methanol. There were obtained 2.5 g. (42% of theory) N(6)-(3-hydroxymethyl-2-methyl-benzyl)-adenosine, which has a melting point of 206–207° C.

Example 3.—Preparation of N(6)-(2-Hydroxymethyl-benzyl)-2-chloroadenosine

A mixture of 6.8 g. triacetyl-2,6-dichloro-9-($\beta$-D-ribofuranosyl)-purine, 3.9 g. 2-hydroxymethyl-benzylamine hydrochloride and 6.0 g. triethylamine in 50 ml. anhydrous tetrahydrofuran was left to stand for 2 days at ambient temperature. The precipitate which forms was filtered off with suction and the filtrate evaporated in a vacuum. The evaporation residue was taken up in benzene and the solution washed several times with water, dried and evaporated. The residue was dissolved in ammoniacal methanol and the solution left to stand overnight at ambient temperature. The precipitate formed was filtered off with suction and recrystallized from water/methanol (1:1). There were obtained 2.9 g. (46% of theory) N(6)-(2-hydroxymethyl-benzyl)-2-chloroadenosine, which has a melting point of 194–196° C.

Example 4.—Preparation of N(6)-(5-Chloro-2-hydroxymethyl-benzyl)-adenosine 8.2 g. triacetyl-6-chloro-9-($\beta$-D-ribofuranosyl)-purine, 3.8 g. 5-chloro-2-hydroxymethyl-benzylamine hydrochloride and 4.5 ml. triethylamine were heated under reflux for 4 hours in 100 ml. isopropanol. The reaction mixture was then worked up in a manner analogous to that described in Example 2. The precipitate obtained upon saponification with a solution of sodium methylate is filtered off with suction and thoroughly washed successively with water, methanol and ether. There were obtained 6.7 g. (about 79% of theory) N(6)-(5-chloro-2-hydroxymethyl-benzyl)-adenosine, which has a melting point of 238–240° C.

Example 5.—Preparation of N(6)-(2-Hydroxymethyl-benzyl)-2-hydroxyadenosine 3.9 g. 2-hydroxy-6-benzylmercapto-9-($\beta$-D-ribofuranosyl)-purine, 2.1 g. 2-hydroxymethyl-benzylamine hydrochloride and 2.0 g. triethylamine were heated under reflux for 4 hours in 50 ml. isopropanol. The precipitate which separates upon standing overnight was filtered off with suction and recrystallized from water, with the addition of active charcoal. There were obtained 2.0 g. (50% of theory) N(6)-(2-hydroxymethyl-benzyl)-2-hydroxyadenosine, which has a melting point of 210–212° C.

Example 6.—Preparation of N(6)-(2-Hydroxymethyl-benzyl)-2-aminoadenosine 4.3 g. triacetyl-2-amino-6-chloro-9-($\beta$-D-ribofuranosyl)-purine, 3.1 g. 2-hydroxymethyl-benzylamine hydrochloride and 3.0 g. triethylamine were heated under reflux for 5 hours in 100 ml. isopropanol. 300 ml. ether were then added to the reaction mixture, triethylamine hydrochloride thereby precipitating out. After filtering, the filtrate was washed with water, dried and evaporated in a vacuum. The residue was taken up in 150 ml. methanol saturated with ammonia and the solution left to stand overnight at ambient temperature. The solvent was then removed in a vacuum and the residue recrystallized from alcohol. There was obtained 1.77 g. (44% of theory) N(6) - (2 - hydroxymethyl - benzyl)-2-amino-adenosine, which has a melting point of 125–128° C.

Example 7.—Preparation of N(6)-(3-Hydroxymethyl-2-methyl-benzyl)-2-bromoadenosine 4.9 g. triacetyl-2-bromo-6-chloro-9-($\beta$-D-ribofuranosyl)-purine, 2.4 g. 3-hydroxymethyl-2-methyl-benzylamine hydrochloride and 2.4 g. triethylamine were heated under reflux for 1 hour in 100 ml. isopropanol. The reaction mixture was then worked up in a manner analogous to that described in Example 6. The crude product obtained was recrystallized from methanol. There were obtained 3.2 g. (66% of theory) N(6)-(3-hydroxymethyl-2-methyl-benzyl)-2-bromoadenosine, which has a melting point of 216–217° C.

The following compounds were obtained in an analogous manner:

(a) from triacetyl-6-chloro-9-(β-D-ribofuranosyl)-purine and 3-hydroxymethyl-benzylamine hydrochloride, there was obtained, in a yield of 60% of theory, N(6)-(3-hydroxymethyl-benzyl)-adenosine; m.p. 180–181° C.;

(b) from triacetyl-6-chloro-9-(β-D-ribofuranosyl)-purine and 4-chloro-2-hydroxymethyl-benzylamine hydrochloride, there was obtained, in a yield of 60% of theory, N(6) - (4 - chloro-2-hydroxymethyl-benzyl)-adenosine; m.p. 181–182° C.;

(c) from triacetyl-6-chloro-9-(β-D-ribofuranosyl)-purine and 5-hydroxymethyl-2-methyl-benzylamine hydrochloride, there was obtained, in a yield of 55% of theory, N(6) - (5 - hydroxymethyl-2-methyl-benzyl)adenosine; m.p. 196–198° C.;

(d) from triacetyl - 2 - amino-6-chloro-9-(β-D-ribofuranosyl) - purine and 3-hydroxymethyl-2-methyl-benzylamine hydrochloride, there was obtained, in a yield of 49% of theory, N(6)-(3-hydroxymethyl-2-methyl-benzyl)-2-aminoadenosine; m.p. 122–124° C.;

(e) from triacetyl - 2 - bromo-6-chloro-9-(β-D-ribofuranosyl)-purine and 2-hydroxymethyl-benzylamine hydrochloride, there was obtained, in a yield of 50% of theory, N(6) - (2-hydroxymethyl-benzyl)-2-bromoadenosine; m.p. 195–196° C;

(f) from triacetyl - 2,6 - dichloro-9-(β-D-ribofuranosyl)-purine and 3 - hydroxymethyl - 2-methyl-benzylamine hydrochloride, there was obtained, in a yield of 45.5% of theory, N(6) - (3-hydroxymethyl-2-methyl-benzyl)-2-chloroadenosine; m.p. 186–188° C.;

(g) from triacetyl - 2,6 - dichloro-9-(β-D-ribofuranosyl)-purine and 4 - chloro - 2-hydroxymethyl-benzylamine hydrochloride, there was obtained, in a yield of 58% of theory, N(6) - (4-chloro-2-hydroxymethyl-benzyl)-2-chloroadenosine; m.p. 228–231° C.;

(h) from triacetyl - 2,6-dichloro-9-(β-D-ribofuranosyl)-purine and 5 - chloro - 2-hydroxymethyl-benzylamine hydrochloride, there was obtained, in a yield of 43% of theory, N(6) - (5-chloro-2-hydroxymethyl-benzyl)-2-chloroadenosine; m.p. 121–125° C.;

(i) from 2 - hydroxy - 6-benzylmercapto-9-(β-D-ribofuranosyl) - purine and 3 - hydroxymethyl-2-methyl-benzylamine hydrochloride, there was obtained, in a yield of 24% of theory, N(6) - (3-hydroxymethyl-2-methyl-benzyl)-2-hydroxyadenosine; m.p. 150–152° C.;

(j) from triacetyl - 6 - chloro - 9-(β-D-ribofuranosyl)-purine and 2-hydroxymethyl-5-methyl-benzylamine hydrochloride, there was obtained, in a yield of 53% of theory, N(6) - (2 - hydroxymethyl-5-methyl-benzyl)-adenosine.

Example 8.—Preparation of N(6)-2-Nitrobenzyl)-adenosine

A solution of 5.5 ml. triethylamine in 25 ml. methanol was added dropwise, in the course of an hour, to a boiling suspension of 2.86 g. 6 - chloro-9-(β-D-ribofuranosyl)-purine and 2.24 g. 2-nitrobenzylamine hydrochloride in 50 ml. methanol. Thereafter, the reaction mixture was heated under reflux for 3 hours. The now clear solution was left to stand overnight at ambient temperature. The precipitate obtained was filtered off with suction and recrystallised from methanol/water (1:1). There were obtained 2.7 g. (67% of theory) N(6)-(2-nitrobenzyl)-adenosine, which has a melting point of 218–220° C.

Example 9.—Preparation of N(6)-(5-Methyl-2-nitrobenzyl)-adenosine 8.2 g. triacetyl - 6 - chloro - 9-(β-D-ribofuranosyl)-purine, 4.5 g. 5-methyl - 2 - nitrobenzylamine hydrochloride and 7.0 ml. triethylamine were heated under reflux for 3 hours in 100 ml. isopropanol. The reaction mixture was then worked up in a manner analogous to that described in Example 2. The crude product obtained was recrystallised twice from methanol. There were obtained 3.4 g. (41% of theory) N(6)(5-methyl-2-nitrobenzyl)-adenosine, which has a melting point of 163–164° C.

Example 10.—Preparation of N(6)-(5-Methyl-2-nitrobenzyl)-2-chloroadenosine 4.5 g. triacetyl - 2,6 - dichloro-9-(β-D-ribofuranosyl)-purine, 2.5 g. 5-methyl-2-nitrobenzylamine hydrochloride and 3.0 g. triethylamine were dissolved in 50 ml. chloroform and left to stand overnight at ambient temperature. The solution was washed with water, dried and evaporated in a vacuum. The precipitate which forms upon standing overnight was filtered off with suction and recrystallised from methanol. There was obtained 1.9 g. (42% of theory) N(6) - (5 - methyl-2-nitrobenzyl)-2-chloroadenosine, which has a melting point of 188–190° C.

Example 11.—Preparation of N(6)-(2-Methoxy-5-nitrobenzyl)-adenosine

Variant a: 8.2 g. triacetyl - 6 - chloro-9-(β-D-ribofuranosyl) - purine, 4.0 g. 2-methoxy-5-nitrobenzylamine and 5.6 ml. triethylamine were heated under reflux for 5 hours in 100 ml. isopropanol. The solution was then evaporated in vacuum and the residue dissolved in chloroform. The chloroform phase was repeatedly washed with water and subsequently dried and evaporated. The residue was dissolved in hot methanol and the solution, after the addition of 2 ml. 1N sodium methylate solution, was heated for a few minutes. The precipitate obtained upon cooling was filtered off with suction and recrystallised from n-butanol. There were obtained 6.3 g. (about 73% of theory) N(6) - (2-methoxy-5-nitrobenzyl)-adenosine, which has a melting point of 184–186° C.

Variant b: 2.7 g. adenosine and 6.0 g. 2-methoxy-5-nitrobenzyl chloride were maintained for 16 hours at 40° C. in 50 ml. dimethyl acetamide. Since, after this time, no appreciable reaction has taken place, the solution was, after the addition of a solution of 4.5 g. sodium iodide in acetone, heated to 60° C. for a further 24 hours. The solution was then added dropwise into 400 ml. ether and the precipitate formed was filtered off with suction. The precipitate was dissolved in 50 ml. water, a small amount of insoluble material was filtered off and the solution, after the addition of 10 ml. 2N aqueous sodium hydroxide solution, was stirred for 1 hour. The precipitate which forms during this time was filtered off with suction, washed with water and dried. After recrystallisation from n-butanol, there was obtained 1.0 g. (23% of theory) N(6)-(2-methoxy-5-nitrobenzyl)-adenosine, which has a melting point of 184–186° C.

The following compounds were obtained in an analogous manner:

(a) from triacetyl - 6 - chloro-9-(β-D-ribofuranosyl)-purine and 3 - nitrobenzylamine hydrochloride, there was obtained, in a yield of 61% of theory, N(6)-(3-nitrobenzyl)-adenosine; m.p. 167–170° C.;

(b) from triacetyl - 6 - chloro - 9-(β-D-ribofuranosyl)-purine and 4 - nitrobenzylamine hydrochloride, there was obtained, in a yield of 26% of theory, N(6)-(4-nitrobenzyl)-adenosine; m.p. 167–170° C.;

(c) from triacetyl - 6 - chloro-9-(β-D-ribofuranosyl)-purine and 2 - methyl-3-nitrobenzylamine hydrochloride, there was obtained, in a yield of 47% of theory, N(6) - (2 - methyl - 3-nitrobenzyl)-adenosine; m.p. 170–171° C.;

(d) from triacetyl - 2,6-dichloro-9-(β-D-ribofuranosyl)-purine and 2 - nitrobenzylamine hydrochloride, there was obtained, in a yield of 27% of theory, N(6)-(2-nitrobenzyl)-2-chloroadenosine; m.p. 215–218° C.;

(e) from triacetyl - 2,6 - dichloro-9-(β-D-ribofuranosyl)-purine and 3-nitrobenzylamine hydrochloride, there was obtained, in a yield of 39% of theory, N(6)-(3-nitro-benzyl)-2-chloroadenosine; m.p. 118–120° C.;

(f) from triacetyl - 2,6 - dichloro-9-(β-D-ribofuranosyl)-purine and 4-nitrobenzylamine hydrochloride, there was obtained, in a yield of 56% of theory, N(6)-(4-nitrobenzyl)-2-chloroadenosine; m.p. 218–220° C.;

(g) from triacetyl - 2,6-dichloro-9-(β-D-ribofuranosyl)-purine and 2 - methyl-3-nitrobenzylamine hydrochloride, there was obtained, in a yield of 33% of theory, N(6) - (2 - methyl - 3-nitrobenzyl)-2-chloroadenosine; m.p. 154–155° C.

Example 12.—Preparation of N(6)-(3-Cyanobenzyl) adenosine 2.86 g. 6-chloro-9-(β-D-ribofuranosyl)-purine, 1.84 g. 3-cyanobenzylamine hydrochloride and 5 ml. triethylamine were heated under reflux for 6 hours in 50 ml. methanol. The reaction mixture was then evaporated in a vacuum and the residue taken up in chloroform and some methanol. The chloroform phase was shaken out several times with water, dried and evaporated in a vacuum and the residue taken up in chloroform and some methanol. The chloroform phase was shaken out several times with water, dried and evaporated in a vacuum. The residue was recrystallised from 70 ml. methanol, with the addition of active charcoal. There were finally obtained 2.4 g. (63% of theory) N(6)-(3-cyanobenzyl)-adenosine, which has a melting point of 78–80° C.

Example 13.—Preparation of N(6)-(4-Cyanobenzyl)-2-chloroadenosine 4.5 triacetyl-2,6-dichloro-9-(β-D-ribofuranosyl)-purine, 2.0 g. 4-cyanobenzylamine hydrochloride and 3.0 g. (4.2 ml.) triethylamine were left to stand overnight at ambient temperature in 50 ml. chloroform. The solution was then washed with water, dried and evaporated in a vacuum. The residue was dissolved in methanol saturated with ammonia. After standing overnight, the solution is evaporated and the residue recrystallised from water/methanol. There was obtained 1.1 g. (26% of theory) N(6)-(4-cyanobenzyl)-2-chloroadenosine, which has a melting point of 212–214° C.

The following compounds were obtained in an analogous manner:

(a) from triacetyl-6-chloro-9-(β-D-ribofuranosyl)-purine and 4-cyanobenzylamine hydrochloride, there was obtained, in a yield of 20% of theory, N(6)-(4-cyanobenzyl)-adenosine; m.p. 133–135° C.;

(b) from 6-chloro-9-(β-D-ribofuranosyl)-purine and 3-cyano-2-methyl-benzylamine hydrochloride, there was obtained, in a yield of 43% of theory, N(6)-(3-cyano-2-methyl-benzyl)-adenosine; m.p. 168–169° C.;

(c) from triacetyl - 2,6-dichloro-9-(β-D-ribofuranosyl)-purine and 3-cyano-2-methyl-benzylamine hydrochloride, there was obtained, in a yield of 34% of theory, N(6) - (3-cyano-2-methyl-benzyl)-2-chloroadenosine; m.p. 203° C.

The compounds of this invention are, as indicated above, useful to improve circulation and, also, to decrease serum lipids in mammals. In order to compare the effectiveness of the instant novel N(6)-substituted adenosine compounds with respect to coronary blood circulation, N(6)-benzyl adenosine, which has already been described in the literature (J. A. Montgomery et al., J. Org. Chem. 28, 2304 (1963)) was selected as a comparison standard.

Adenosine on intravenous administration to mammals and humans produces a vasodilation. In particular, this effect is noticeable in the coronary vascular system wherein a marked increase in blood circulation results from the vasodilation produced by the administration of the adenosine (Berne, Blackman, and Gardner, J. Clin. Invest. 36, 1101 (1957)). Due to the rapid deamination of the adenosine, however, this effect is extremely transient.

N(6)-substituted derivatives of adenosine also exert a marked coronary vasodilating effect of high specificity, but in contrast to adenosine, the effect is a prolonged one.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen, i.e., to an improvement in the oxygen supply to the myocardium which is the ultimate aim sought to be achieved with all coronary dilating agents.

For the purpose of obtaining an exact basis for evaluating the results of the tests, the decrease in coronary arteriovenous oxygen difference (at the time of the maximum effect) is reported in volume percent as compared to the starting value. The greater the value reported the more significant was the coronary oxygen supply increase.

The tests were carried out using 32 alert unanesthetized dogs, each weighing between 12 and 16 kg. and following the procedure of Raymond, Huvos and Gregg, Proc. Soc. Exp. Biol. Med. 113, 876 (1963). Catheters were implanted surgically into the Sinus coronarius, the aorta and the vena cava of the animals whereby it was made possible to photometrically determine the coronary arteriovenous saturation difference (Brinkman, Arch. Chir. Nederl. 1, 177 (1949)) and from the actual hemoglobin values obtained to convert the values into the corresponding volume percents. The compounds were administered intraveneously in the amounts indicated in 1 ml. of a 5% Lutrol-9-solution (liquid polyethylene oxide, molecular weight about 400, BASF-Ludwigshafen, Germany) in 5.5 percent aqueous glucose. The compounds employed in the tests are set forth in Table 1, below, in which there are also set forth the results obtained, in terms of decrease of coronary $O_2$ depletion, as explained above, measured at the time of maximum effect. The results are expressed in volume percent, relative to the starting values for $O_2$ depletion. It can be seen from Table 1 that the novel compounds exhibit marked coronary dilating properties, which are superior to that of the known compound, viz, N(6)-benzyl adenosine.

TABLE 1

| Test compound | Dosage, i.v. (mg./kg.) | Maximum decrease in $O_2$ depletion (vol. percent) |
|---|---|---|
| N(6)-benzyl adenosine | 0.4 | 2.5 |
| N(6)-(2-hydroxymethyl-benzyl)-adenosine | 0.4 | 4.6 |
| N(6)-(2-hydroxymethyl-benzyl)-2-chloro-adenosine | 0.2 | 6.7 |
| N(6)-(2-nitrobenzyl)-adenosine | 0.4 | 7.5 |
| N(6)-(2-nitrobenzyl)-2-chloro-adenosine | 0.4 | 3.8 |
| N(6)-(3-hydroxymethyl-2-methylbenzyl)-adenosine | 0.2 | 7.5 |
| N(6)-(2-hydroxymethyl-benzyl)-2-hydroxy-adenosine | 0.2 | 5.0 |
| N(6)-(2-hydroxymethyl-benzyl)-2-amino-adenosine | 0.4 | 8.2 |
| N(6)-(3-hydroxymethyl-benzyl)-adenosine | 0.4 | 5.4 |
| N(6)-(3-hydroxymethyl-2-methylbenzyl)-adenosine | 0.4 | 5.1 |
| N(6)-(3-hydroxymethyl-2-methylbenzyl)-2-amino-adenosine | 0.2 | 9.1 |
| N(6)-(2-hydroxymethyl-benzyl)-2-bromo-adenosine | 0.4 | 6.3 |
| N(6)-(3-hydroxymethyl-2-methylbenzyl)-2-chloro-adenosine | 0.2 | 6.2 |
| N(6)-(3-hydroxymethyl-2-methylbenzyl)-2-hydroxyadenosine | 0.2 | 7.6 |
| N(6)-(5-methyl-2-nitro-benzyl-2-chloro-adenosine | 0.2 | 6.3 |
| N(6)-(3-nitrobenzyl)-adenosine | 0.4 | 5.3 |
| N(6)-(4-nitrobenzyl)-adenosine | 0.4 | 5.4 |
| N(6)-(3-nitrobenzyl)-2-chloro-adenosine | 0.4 | 5.9 |
| N(6)-(3-cyano-2-methyl-benzyl)-2-chloro-adenosine | 0.2 | 5.9 |

The effectiveness of the instant compounds on the lowering of free fatty acids in the blood serum was determined following the procedure of Duncombe et al. (Clin. Chim. Acta 9, 122 [1964]). The procedure was carried out using for each compound ten healthy male Sprague-Dawley rats, each weighing about 200 g. The animals were kept without food for 16 to 18 hours before application. The compounds were administered either p.o., with a stomach tube, suspended in tylose or intraperitoneally (i.p.) in an aqueous buffered solution. The control group in each instance received only the solvent in the same manner of application. One hour after application of the compounds (or of the solvent alone for establishing the control values) the animals were killed and exsanguinated and the free fatty acids determined according to the method of Duncombe, supra.

The results are set forth in the following Table 2, expressed as percentage reduction of the free fatty acids in the serum of treated animals relative to the control animals.

TABLE 2

| Test compound | Dosage, mg./kg. | Application method | Depression of serum lipids (in percent) |
|---|---|---|---|
| Nicotinic acid* | 10 | P.o. | 15 |
| Do.* | 20 | P.o. | 38 |
| N(6)-(2-hydroxymethyl-benzyl)-2-chloro-adenosine | 0.1 | P.o. | 27 |
| N(6)-(2-nitrobenzyl)-2-chloro-adenosine | 0.1 | P.o. | 34 |
| Nicotinic acid* | 10 | I.p. | 28 |
| N(6)-(3-cyano-2-methylbenzyl)-2-chloro-adenosine | 0.5 | I.p. | 27 |

*Reference standard.

NOTE.—P.o. means per os, i.e., oral administration; i.p. means intraperitoneally.

The data in Table 2 show a substantially better effectiveness of the new compounds as compared with the known compound, nicotinic acid in that much less of the new compounds is required to induce the same result.

As previously indicated, the adenosine derivatives of this invention are readily adapted to therapeutic use as cardio and fat-affecting agents. The toxicity of the compounds of the invention has been found to be quite low or substantially non-existent when they are administered in amounts that are sufficient to achieve the desired therapeutic effects. Moreover, no other pharmocological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragées, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg. active ingredient per dosage unit. Preferably, the compositions are compounded so that for parenteral administration, 0.5–5 mg. active compound/dosage unit is present and for oral administration 2–10 mg. of compound/dosage unit.

As pharmaceutical compositions according to the present invention, there can be used all the conventional oral or parenteral forms of administration, for example, tablets, capsules, dragées, syrups, solutions, suspensions, drops, suppositories and the like. For this purpose, the active material is mixed with solid or liquid carrier materials and the mixture subsequently brought into the desired form. Examples of solid carrier materials include lactose, mannitol, starch, talc, methyl-cellulose, silicic acid, calcium phosphate, magnesium stearate, agar-agar and gelatine to which, if desired, can be added coloring materials and flavorings. Liquid carrier materials for injection solutions must, of course, be sterile and are preferably packed into ampoules.

It will be understood that the specification and examples are illustrative but not limitative of the present invention and that other embodiments within the spirit and scope of the invention will suggest themselves to those skilled in the art.

What is claimed is:

1. N(6)-substituted adenosine compound of the formula:

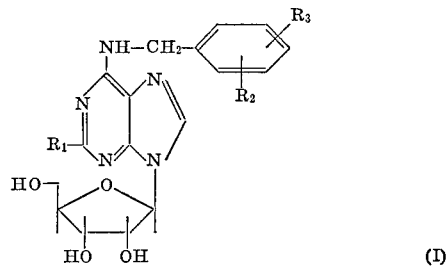

wherein $R_1$ is hydrogen, halogen, amino, or hydroxyl;
$R_2$ is cyano or hydroxy-methyl; and
$R_3$ is hydrogen, halogen, lower alkyl or lower alkoxy radical;
or a pharmacologically compatible salt thereof.

2. Compound as claimed in claim 1 wherein said lower alkyl and lower alkoxy radicals contain from 1 to 10 carbon atoms each.

3. Compound as claimed in claim 1 wherein $R_1$ is hydrogen.

4. Compound as claimed in claim 1 wherein $R_1$ is halogen.

5. Compound as claimed in claim 1 wherein $R_1$ is amino.

6. Compound as claimed in claim 1 wherein $R_1$ is hydroxy.

7. Compound as claimed in claim 1 wherein $R_1$ is hydrogen, amino, or hydroxy and $R_2$ is hydroxymethyl.

8. Compound as claimed in claim 1 wherein $R_2$ is cyano.

9. Compound as claimed in claim 1 wherein $R_2$ is hydroxymethyl.

10. Compound as claimed in claim 1 wherein $R_3$ is hydrogen.

11. Compound as claimed in claim 1 wherein $R_3$ is halogen.

12. Compound as claimed in claim 1 wherein $R_3$ is lower alkyl.

13. Compound as claimed in claim 1 wherein $R_3$ is lower alkoxy.

14. Compound as claimed in claim 1 designated N(6)-(2-hydroxymethyl-benzyl)-2-amino-adenosine.

15. Compound as claimed in claim 1 designated N(6)-(3-hydroxymethyl-2-methyl-benzyl)-2-amino-adenosine.

16. Compound as claimed in claim 1 designated N(6)-(3-hydroxymethyl-2-methyl-benzyl)-adenosine.

17. Compound as claimed in claim 1 designated N(6)-(3-hydroxymethyl-2-methyl-benzyl)-2-hydroxyadenosine.

References Cited

UNITED STATES PATENTS

| 3,506,643 | 4/1970 | Thiel et al. | 260—211.5 R |
| 3,551,409 | 12/1970 | Kampe et al. | 260—211.5 R |
| 3,590,029 | 6/1971 | Koch et al. | 260—211.5 R |

JOHNNIE R. BROWN, Primary Examiner

U.S. Cl. X.R.

424—180